Patented July 6, 1948

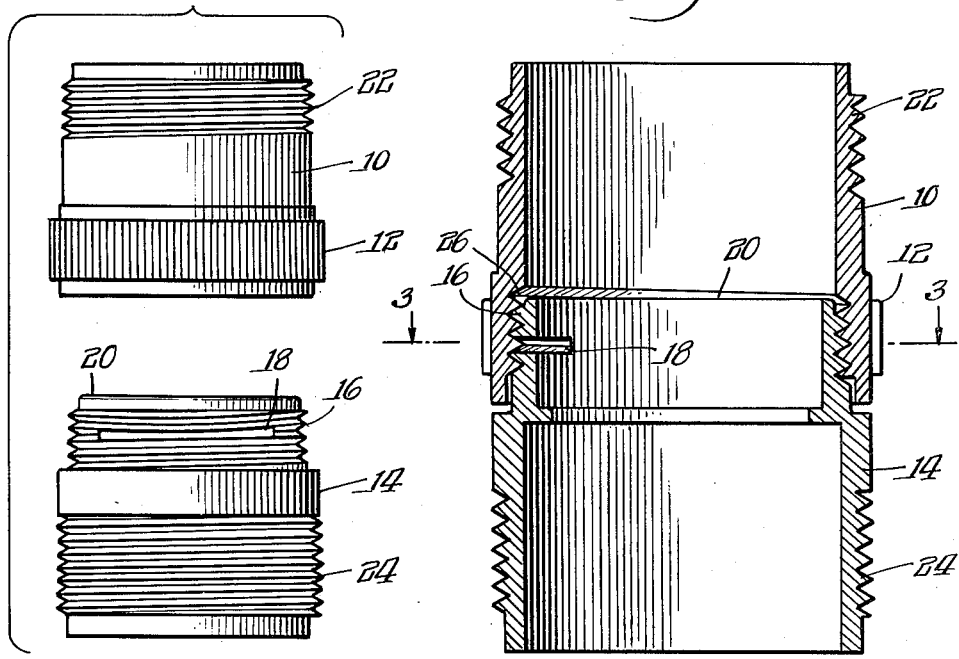
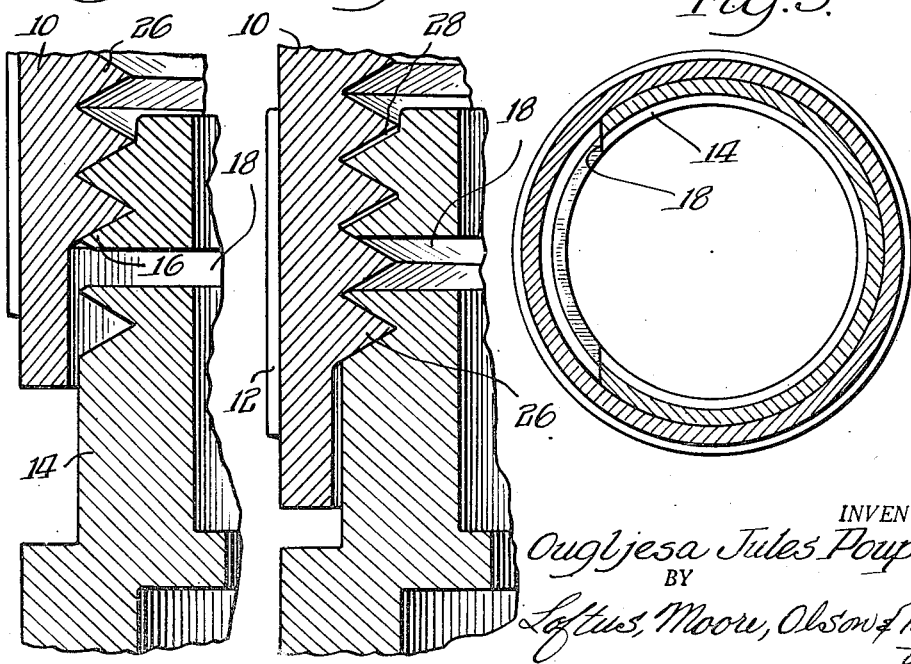

2,444,847

UNITED STATES PATENT OFFICE 2,444,847

COUPLING THREAD LOCKING MEANS

Ougljesa Jules Poupitch, Chicago, Ill., assignor to Illinois Tool Works, Chicago, Ill., a corporation of Illinois Application October 30, 1944, Serial No. 560,966

1 Claim. (Cl. 285—145)

The present invention relates to locking devices for holding screw thread parts in any desired predetermined position without the use of auxiliary locking means, and more particularly to a locking device for holding the parts of a threaded coupling in a predetermined position.

In certain applications of couplings for conduits or pipes and the like and also in the case of plug connectors housed in coupling units where such devices are to be connected and disconnected, it would be very desirable to provide a locking arrangement for holding the screw threaded parts in a predetermined position. Particularly in the case of conduits and the plug connectors, such as used in conjunction with certain electrical apparatus, the threaded coupling members are frequently coupled and uncoupled, and yet it is desired to have the members retained with a locking action. In accordance with the present invention a threaded coupling for conduits, pipes and the like comprising hollow threaded male and female members is arranged with a helical slit extending for a fraction of the circumference in a direction generally parallel to the threads thereon adjacent one end of one of the members. The portion of the material between the slit and the end of the member is displaced to narrow the slit so as to shift the threads thereon in order to provide a locking action when the male and female members are coupled together.

It, therefore, is an object of the present invention to provide an improved threaded coupling for conduits, pipes, and the like having a locking arrangement for holding the screw threaded parts in desired predetermined position.

The invention together with other and further objects thereof will subsequently be described in conjunction with the accompanying drawing wherein Figure 1 is a disassembled view of the male and female coupling members;

Figure 2 is an assembled cross sectional view of the coupling members;

Figure 3 is a cross sectional view as seen in the direction of the arrows along the line 3—3 of Figure 2; and Figures 4 and 5 progressively illustrate the locking action of the coupling members as seen in Figure 2.

In the drawings there is shown a female coupling member 10 having a gripping surface or knurled ring 12 on the exterior. A cooperating male member 14 has an externally threaded portion 16 which is adjacent one end and is provided with a helical slit 18. The material between the center of the slit 18 and the end 20 of the male coupling member 14 preferably is displaced so as to narrow the center of the slit 18 thereby displacing the threads 16 which are between the slit and the end of the coupling member. The coupling members 10 and 14 may be suitably secured to the ends of conduits, pipes and the like in any manner including a threaded connection provided by the externally threaded portions 22 and 24 on the coupling members 10 and 14, respectively.

The cross sectional view in Figure 2 shows the coupling members 10 and 14 connected together with the internally threaded portion 26 of the female coupling member 10 in engagement with the threads 16 on either side of the slit 18 in the male member 14. From Figure 3 it will be noted that the slit 18, which preferably lies parallel to the helical threads 16, extends for a fraction of the circumference of the coupling member. While a single slit 18 has been shown, it of course will be appreciated that a plurality of such slits could be provided, and furthermore while the slit 18 has been shown as being located in the male member, a corresponding slit could instead be provided in the female member.

Preferably the threads 16 are formed on the member and then the material extending between the slit 18 and the end 20 is pressed inwardly so as to displace the threads between the slit and the end of the member a small amount. For applications where the coupling members are to be coupled and uncoupled a considerable number of times during use, the material used in the male member preferably is such as to provide a desired degree of resiliency to that portion extending between the slit 18 and the end of the member. The resiliency of that portion will cause the displaced threads to return to their displaced position when the coupling is uncoupled.

The action obtained to provide the locking effect between the male and female thread portions of the coupling members is illustrated in Figures 4 and 5. In Figure 4 the female member 10 only is in engagement with the initial thread portion of the male member 14 so that the threads 26 generally engage both sides of the thread teeth. As the female member 10 is moved farther on the internal threads 26 engage those threads 16 which are located beyond the slit 18 so that the slit 18 is expanded slightly. Thus the principal pressure between the threads of the two coupling members above the slit 18 occurs between the top side of the threads 26 and the bottom side of the threads 16. To illustrate the action Figures 4 and 5 have been exaggerated so as to show the expansion of the slit 18, and the substantial absence of pressure between the upper surface of the threads 16 and the lower surface of certain of the threads 26 as indicated by a clearance or space 28.

From the foregoing it will be seen that there has been provided a coupling device which has a locking action between the threaded parts sufficient to hold the threaded parts in desired predetermined adjustment. While the drawing has shown a preferred type of embodiment, it will be appreciated by those skilled in the art that a similar arrangement might be provided for other types of coupling as in the instance of pipe unions where obviously of course the female member would constitute a follower ring. Such follower rings are of course commonly used in conduit couplings which house plug connectors for electrical equipment.

While for the purpose of describing and illustrating the present invention a preferred embodiment has been illustrated, it is to be understood that the invention is not to be limited thereby since such variations and modifications are contemplated as are commensurate with the spirit and scope of the invention set forth in the following claim.

This invention is hereby claimed as follows:

In a pipe coupling for conduits which is to be coupled and uncoupled a considerable number of times during use, the combination of a relatively thin walled short pipe section having adjacent one end exteriorly formed threads for connection to a pipe or conduit and adjacent the other end interiorly formed threads, and a second relatively thin walled short pipe section having adjacent one end exteriorly formed threads for connection to a pipe or conduit and having adjacent the other end portion provided with exteriorly formed threads for cooperation and engagement with the interiorly formed threads of said first pipe section, said latter threaded portion having adjacent the end a helical slit extending for a fraction of the circumference in the direction of the threads, that portion of the material between said slit and the end of said member having its threads displaced an amount sufficient to provide a resilient tension locking action for the assembled pipe sections whenever coupled together.

OUGLJESA JULES POUPITCH.

REFERENCES CITED

The following references are of record in the file of this patent:

UNITED STATES PATENTS

| Number | Name | Date |
|---|---|---|
| 126,553 | Kellam | May 7, 1872 |

FOREIGN PATENTS

| Number | Country | Date |
|---|---|---|
| 546,046 | Great Britain | June 24, 1924 |